United States Patent
Akatsuka et al.

(10) Patent No.: US 9,764,758 B2
(45) Date of Patent: Sep. 19, 2017

(54) APPARATUS AND METHOD FOR CONTROLLING ELECTRIC POWER STEERING SYSTEM

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Hisaya Akatsuka, Aichi-ken (JP); Daiji Watanabe, Nagoya (JP); Motoaki Kataoka, Kariya (JP); Yoshio Kudo, Machida (JP); Yoshiaki Suzuki, Shizuoka-ken (JP)

(73) Assignees: DENSO CORPORATION, Kariya, Aichi-pref (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 282 days.

(21) Appl. No.: 14/419,327

(22) PCT Filed: Jul. 31, 2013

(86) PCT No.: PCT/JP2013/070715
§ 371 (c)(1),
(2) Date: Feb. 3, 2015

(87) PCT Pub. No.: WO2014/021369
PCT Pub. Date: Feb. 6, 2014

(65) Prior Publication Data
US 2015/0210310 A1    Jul. 30, 2015

(30) Foreign Application Priority Data
Aug. 3, 2012 (JP) .................. 2012-172721

(51) Int. Cl.
B62D 5/00 (2006.01)
B62D 5/04 (2006.01)
(Continued)

(52) U.S. Cl.
CPC ............. *B62D 5/0463* (2013.01); *B62D 5/04* (2013.01); *B62D 5/0472* (2013.01); *B62D 6/00* (2013.01); *B62D 6/04* (2013.01); *B62D 6/10* (2013.01)

(58) Field of Classification Search
None
See application file for complete search history.

(56) References Cited

U.S. PATENT DOCUMENTS 6,742,620 B2 *   6/2004   Eidam ............... B62D 5/0472
                                                  180/446
7,975,801 B2 *   7/2011   Tashiro .............. B62D 5/0472
                                                  180/446
(Continued)

FOREIGN PATENT DOCUMENTS

DE   102006051747   5/2007
EP   1 623 910     2/2006
(Continued)

OTHER PUBLICATIONS

Office Action dated Oct. 6, 2015 in corresponding Japanese Application No. 2012172721 with English translation.
(Continued)

Primary Examiner — Jonathan M Dager
(74) Attorney, Agent, or Firm — Harness, Dickey & Pierce, P.L.C.

(57) ABSTRACT

An electric power steering system includes a basic assist amount calculation section calculating a basic assist amount for assisting the manipulation of a steering wheel, and an assist compensation amount calculation section calculating
(Continued)

an assist compensation amount for correcting the basic assist amount. The system includes an assist amount correction section calculating a corrected assist amount by correcting the basic assist amount based on the assist compensation amount, and a motor drive section driving a motor using the corrected assist amount. The assist compensation amount calculation section uses a reverse input specification that more transmits the signal components of specific frequency in road-surface input torque, to a steering wheel than in the case of using only the basic assist amount, and calculates the assist compensation amount suitable for a vehicle-state value, such as a steering torque, to suppress variation in the transmission characteristics due to variation of the vehicle-state value.

20 Claims, 8 Drawing Sheets

(51) Int. Cl.
*B62D 6/00* (2006.01)
*B62D 6/04* (2006.01)
*B62D 6/10* (2006.01)

(56) References Cited

U.S. PATENT DOCUMENTS

| | | | | |
|---|---|---|---|---|
| 8,271,163 | B2* | 9/2012 | Oblizajek | B62D 5/0472 180/446 |
| 8,666,604 | B2* | 3/2014 | Fehlings | B62D 5/0481 701/41 |
| 8,798,864 | B2* | 8/2014 | Champagne | B62D 5/0472 701/42 |
| 8,831,854 | B2* | 9/2014 | Killian | B60T 8/173 188/73.35 |
| 9,221,490 | B2* | 12/2015 | Shibuya | B62D 5/003 |
| 9,440,674 | B2* | 9/2016 | Oblizajek | B62D 5/0472 |
| 9,457,840 | B2* | 10/2016 | Kouchi | B62D 6/06 |
| 9,540,040 | B2* | 1/2017 | Varunjikar | B62D 5/0472 |
| 9,540,044 | B2* | 1/2017 | Kaufmann | B62D 5/0463 |
| 2002/0125063 | A1 | 9/2002 | Kurishige et al. | |
| 2003/0120404 | A1 | 6/2003 | Endo | |
| 2004/0079578 | A1 | 4/2004 | Kurishige et al. | |
| 2004/0200661 | A1* | 10/2004 | Sugitani | B62D 6/008 180/402 |
| 2006/0017413 | A1 | 1/2006 | Okamoto et al. | |
| 2006/0069481 | A1* | 3/2006 | Kubota | B62D 5/0463 701/41 |
| 2008/0035411 | A1* | 2/2008 | Yamashita | B62D 5/046 180/443 |
| 2008/0189014 | A1 | 8/2008 | Tanaka et al. | |
| 2008/0277192 | A1* | 11/2008 | Nishimura | B62D 5/0463 180/444 |
| 2009/0018726 | A1* | 1/2009 | Saruwatari | B62D 5/0466 701/41 |
| 2009/0125186 | A1* | 5/2009 | Recker | B62D 5/0472 701/41 |
| 2009/0192679 | A1 | 7/2009 | Kobayashi et al. | |
| 2009/0224502 | A1* | 9/2009 | Yamawaki | B60G 17/06 280/124.108 |
| 2009/0254253 | A1* | 10/2009 | Ghoneim | B62D 5/008 701/42 |
| 2009/0294206 | A1* | 12/2009 | Oblizajek | B62D 5/0472 180/446 |
| 2010/0228440 | A1* | 9/2010 | Yamazaki | B62D 6/008 701/41 |
| 2010/0280715 | A1 | 11/2010 | Kobayashi et al. | |
| 2010/0286871 | A1 | 11/2010 | Kobayashi et al. | |
| 2010/0292896 | A1 | 11/2010 | Watanabe et al. | |
| 2011/0209939 | A1* | 9/2011 | Ono | B62D 6/008 180/447 |
| 2013/0073146 | A1* | 3/2013 | Konomi | B62D 5/0472 701/41 |
| 2015/0120140 | A1* | 4/2015 | Kudo | B62D 6/008 701/41 |
| 2015/0191200 | A1* | 7/2015 | Tsubaki | B62D 15/0285 701/42 |
| 2016/0288825 | A1* | 10/2016 | Varunjikar | B62D 5/0484 |

FOREIGN PATENT DOCUMENTS

| | | |
|---|---|---|
| JP | H10-16809 A | 1/1998 |
| JP | 2001-207594 A | 8/2001 |
| JP | 2001-278085 A | 10/2001 |
| JP | 2001-334948 A | 12/2001 |
| JP | 2002-211427 | 7/2002 |
| JP | 2007-125999 A | 5/2007 |
| JP | 2007-302047 | 11/2007 |
| JP | 2009-227125 | 10/2009 |
| JP | 2010-036846 A | 2/2010 |
| JP | 4419840 B2 | 2/2010 |
| JP | 2010-090953 A | 4/2010 |
| JP | 2010/184652 A | 8/2010 |
| JP | 4883134 B2 | 2/2012 |
| WO | WO2006/075775 | 7/2006 |

OTHER PUBLICATIONS

International Search Report (in Japanese with English Translation) for PCT/JP2013/070715, mailed Oct. 29, 2013; ISA/JP.

* cited by examiner

STEERING WHEEL → ROAD SURFACE

ROAD SURFACE → STEERING WHEEL

Bode Diagram

APPARATUS AND METHOD FOR CONTROLLING ELECTRIC POWER STEERING SYSTEM

CROSS REFERENCE TO RELATED APPLICATIONS

This application is a U.S. National Phase Application under 35 U.S.C. 371 of International Application No. PCT/JP2013/070715 filed on Jul. 31, 2013 and published in Japanese as WO 2014/021369 on Feb. 6, 2014. This application is based on and claims the benefit of priority from Japanese Patent Application No. 2012-172721 filed on Aug. 3, 2012. The entire disclosures of all of the above applications are incorporated herein by reference.

BACKGROUND

Technical Field

The present invention relates to an apparatus and a method for controlling an electric power steering system that assists a steering wheel manipulation (steering) of a vehicle by using a motor, and in particular, to an apparatus and a method for controlling an electric power steering system that is ensured to correct a basic assist amount to assist the manipulation of the steering wheel with use of an assist compensation amount.

Background Art

There is known an apparatus which is able to determine an assist amount of a motor by distinguishing a steering wheel torque from a torque that is input from a road surface (hereinafter referred to as road-surface input torque) (see Patent Literature 1 or 2). Making use of such a determination of an assist amount of a motor by distinguishing a steering wheel torque from a road-surface input torque, the apparatus disclosed in Patent Literature 1 or 2 treats the road-surface input torque as unnecessary information and exerts control under which the road-surface input torque is suppressed from being transmitted to the steering wheel.

Further, there is another known technique, as described in Patent Literature 3, for suppressing transmission of a road-surface input torque to a steering wheel, treating the road-surface input torque as being unnecessary.

Patent Literature 1 JP-B-4419840
Patent Literature 2 JP-B-4883134
Patent Literature 3 JP-A-2001-334948

Technical Problem

As described in Patent Literatures 1 to 3 set forth above, the information on a road-surface input torque has been considered to be unnecessary in the conventional art. This is because an electric power steering system is intended to be used for giving an assist when the driver turns the steering wheel.

However, according to the findings of the inventors of the present invention, a driver habitually manipulates a steering wheel, feeling the grip between the road surface and the tires or feeling the states of the vehicle body, such as vibration of the vehicle body, from the torque that is transmitted from the road surface side to the steering wheel. These findings lead to another finding that an easy steering wheel manipulation is achieved not only by the control under which the road-surface input torque is suppressed from being transmitted to the steering wheel as in the conventional art, but also by transmitting the road-surface input torque to the steering wheel, depending on the road surface, to have the driver feel the grip between the road surface and the tires, the vibration of the vehicle body, or the like.

SUMMARY

In light of these circumstances, it is desired to provide an apparatus and method for controlling an electric power steering system, which enables control under which steering is conducted easier than in the conventional art.

According to an aspect related to a typical example for achieving the object, there is provided an electric power steering control apparatus which is provided to an electric power steering system that includes: an input shaft connected to a steering wheel of a vehicle and rotated together with the steering wheel by a steering wheel torque that is an input caused by manipulation of the steering wheel; a torque detector detecting torque applied to a torsion bar on the basis of a torsion angle of the torsion bar, the torsion bar being provided to a part of a torque transmission path for transmitting rotation of the input shaft to the steering wheel; and a motor generating an assist steering force for assisting the manipulation of the steering wheel when the steering wheel is steered by the manipulation of the steering wheel, the apparatus controlling the assist steering force by controlling the motor. The apparatus includes: a basic assist amount calculation section calculating a basic assist amount for assisting the manipulation of the steering wheel on the basis of a torque detected by the torque detector; an assist compensation amount calculation section calculating an assist compensation amount for correcting the basic assist amount calculated by the basic assist amount calculation section; an assist compensation correction section calculating a corrected assist amount by correcting the basic assist amount calculated by the basic assist amount calculation section on the basis of the assist compensation amount calculated by the assist compensation amount calculation section; and a motor drive section driving the motor on the basis of the corrected assist amount from the assist amount correction section. The assist compensation amount calculation section is characterized in that it is configured to use at least two kinds of signals, as input signals, that reflect operations of the electric power steering system to calculate the assist compensation amount so as to meet both of the following specifications (a) and (b) which are:

(a) a forward input specification corresponding to characteristics of transmitting the steering wheel torque to a road surface in the electric power steering system, the characteristics being equal to those of the case where the motor is driven with no correction of the basic assist amount by the assist compensation amount; and (b) a reverse input specification corresponding to characteristics of transmitting road-surface input torque that is a force received by the steering wheel from a road surface on which the vehicle runs, in the electric power steering system, the characteristics exhibiting more transmission of the road-surface input torque to the steering wheel than in the case where the motor is driven with no correction of the basic assist amount by the assist compensation amount.

The assist compensation amount calculation section is characterized in that it calculates an assist compensation amount suitable for a vehicle-state value that influences the transmission characteristics of the road-surface input torque to thereby suppress frequency alteration at a resonance point in the transmission characteristics, the frequency alteration being attributed to variation of the vehicle-state value.

As mentioned above, in the conventional art, transmission of a road-surface input torque has been considered to be unnecessary for the manipulation of a steering wheel. However, according to the findings of the inventors of the present invention, a driver habitually manipulates a steering wheel, feeling the grip between a road surface and the tires or the states of the vehicle, such as vibration of the vehicle body, through the torque that is transmitted from the road-surface side to the steering wheel.

In this regard, according to the typical example, the assist compensation amount calculation section uses at least two kinds of signals, as input signals, to which the operation of the electric power steering system is reflected. Accordingly, a reverse input specification is ensured to be designed without giving an influence to a forward input specification, and the reverse input specification is ensured to transmit more road-surface input torque.

Thus, the driver is able to manipulate the steering wheel, feeling the grip between a road surface and the tires or the states of the vehicle, such as vibration of the vehicle body, through the steering wheel, thereby facilitating steering.

Moreover, the assist compensation amount calculation section calculates an assist compensation amount suitable for a vehicle-state value, in order to suppress the frequency alteration at the resonance point, which is attributed to the variation of the vehicle-state value, in the road-surface input torque transmission characteristics. Accordingly, although the vehicle-state value varies, the degree of variation is small in the transmission of the grip between the road surface and the tires or the states of the vehicle body, which can be felt through the steering wheel. In this way, steering is more facilitated.

DESCRIPTION OF EMBODIMENTS

With reference to the accompanying drawings, hereinafter are described several embodiments of an apparatus and method for controlling an electric power steering system, according to the present invention.

First Embodiment

Figure 1:
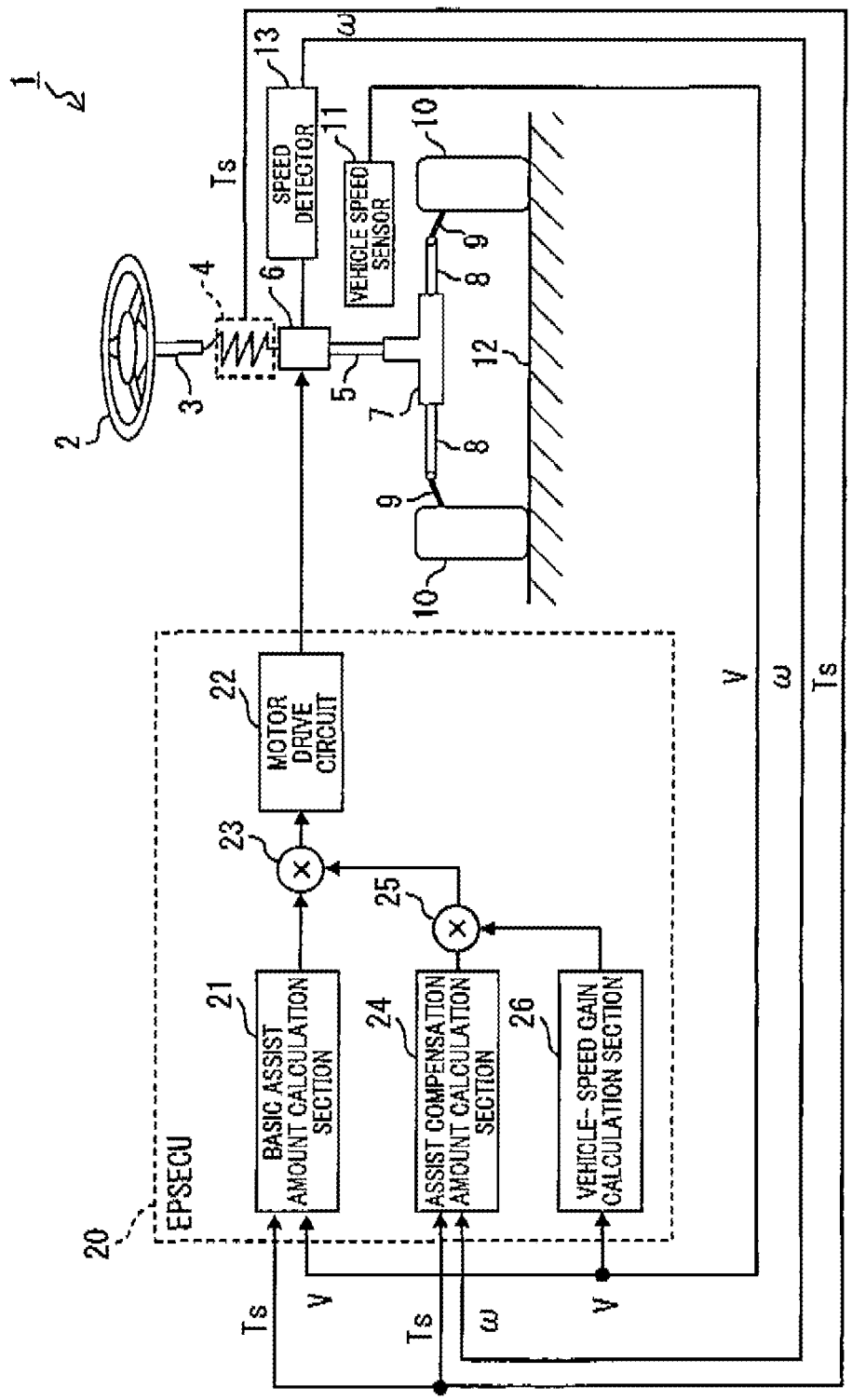
FIG. 1 is a block diagram schematically illustrating an electric power steering system of various embodiments related to the present invention.

An embodiment of the invention is described below referring to the drawings. An electric power steering system 1 shown in FIG. 1 allows a motor 6 to assist the driver's manipulation of a steering wheel 2.

The steering wheel 2 is fixed to an end of a steering shaft 3 that is an input shaft, while a torque sensor 4 is connected to the other end of the steering shaft 3. The torque sensor 4 has an end to which an intermediate shaft 5 is connected.

The torque sensor 4 detects a steering torque Ts. Specifically, the torque sensor 4 has a torsion bar connecting between the steering shaft 3 and the intermediate shaft 5, and detects the torque applied to the torsion bar on the basis of a torsion angle of the torsion bar.

The motor 6 assists (supports) the steering force of the steering wheel 2. The motor 6 has a rotary shaft having an end which is provided with a worm gear. The worm gear is engaged with a worm wheel which is mounted to the intermediate shaft 5. Thus, the rotation of the motor 6 is transmitted to the intermediate shaft 5. In contrast, when the intermediate shaft 5 is rotated by the manipulation of the steering wheel 2 or the torque input from a road surface 12 (road-surface input torque), the rotation is transmitted to the motor 6 to thereby rotate the motor 6 as well.

Further, the system includes a speed detector 13 that detects a rotational angular speed (hereinafter referred to as motor speed $\omega$) of the motor 6. The speed detector 13 detects (estimates) the motor speed $\omega$ on the basis, for example, of a motor voltage V and a motor current i, and a relationship $\omega=(Ri-V)/K$, where R is a motor resistance and K is a constant of a counter electromotive force of the motor. Since the method of detecting the motor speed $\omega$ is well known, explanation in detail is omitted. It should be noted that, when a rotation sensor is provided inside the motor 6, the motor speed $\omega$ may be detected on the basis of a signal from the rotation sensor.

The intermediate shaft 5 has an end which is connected to a steering gear box 7, the end being opposite to the end to which the torque sensor 4 is connected. The steering gear box 7 is configured by a gear mechanism that is constituted of a rack and a pinion gear, not shown. The rack has teeth which are engaged with the pinion gear mounted to the end of the intermediate shaft 5. Accordingly, when the driver turns the steering wheel 2, the intermediate shaft 5 is rotated (i.e. the pinion gear is rotated) to thereby move the rack from side to side. The rack has both ends to which respective tie rods 8 are mounted, and thus the tie rods 8 are reciprocally moved from side to side together with the rack. With the reciprocal movement, the tie rods 8 push or pull knuckle arms 9 which are mounted to ends of the respective tie rods to thereby change the directions of tires 10.

The system also includes a vehicle speed sensor 11 in a predetermined portion of the vehicle to detect a vehicle speed V.

With this configuration, when the driver rotates the steering wheel 2, the rotation is transmitted to the steering gear box 7 via the steering shaft 3, the torque sensor 4 and the intermediate shaft 5. Then, in the steering gear box 7, the rotation of the intermediate shaft 5 is converted to the right-and-left movement of the tie rods 8, and the movement of the tie rods 8 steers the right and left tires 10.

An EPSECU (electrically powered steering ECU (electronic control unit)) 20 that is an electric power steering control apparatus is activated by electrical power from an in-vehicle battery, not shown. The EPSECU 20 calculates an assist steering force on the basis of the steering torque Ts detected by the torque sensor 4, the motor speed $\omega$ detected by the speed detector 12, and the vehicle speed V detected by the vehicle speed sensor 11. According to the result of the calculation, the EPSECU 20 drives and controls the motor 6 to control an assist amount for assisting the power to be spent by the driver in turning the steering wheel 2 (or the power of steering both of the tires 10).

It should be noted that the EPSECU 20 also performs a process of realizing a method for controlling the electric power steering system.

Specifically, the EPSECU 20 includes a basic assist amount calculation section 21 that calculates a basic assist amount, an assist compensation amount calculation section 24 that calculates an assist compensation amount, a vehicle-speed gain calculation section 26 that calculates a vehicle-speed gain, a multiplier 25 that calculates a vehicle-speed correcting assist compensation amount by multiplying the assist compensation amount with the vehicle-speed gain, an adder 23 that calculates an assist command by adding the vehicle-speed correcting assist compensation amount to the basic assist amount, and a motor drive circuit 22 that drives the motor 6 on the basis of an assist command from the adder 23. It should be noted that the assist command corresponds to the corrected assist amount, and the adder 23 corresponds to the assist amount correction section.

Besides, the EPSECU 20 includes various functional blocks, such as a phase compensator that enhances the stability of the basic assist amount, a feedforward controller that enhances the speed of response to the change of the steering torque Ts, and a feedback controller that performs feedback control (e.g., PI control) on the basis of a difference between an assist command (current command) and the actual current value of the motor 6 to determine a final current command to be given to the motor drive circuit 22. These functional blocks are omitted from FIG. 1.

The basic assist amount calculation section 21 calculates a basic assist amount on the basis of the steering torque Ts detected by the torque sensor 4 and the vehicle speed V detected by the vehicle speed sensor 11. Specifically, for example, the basic assist amount calculation section 21 calculates a basic assist amount by referring, for example, to a steering torque—basic assist amount map that has been prepared in advance, so that the basic assist amount is increased (i.e. the torque in a direction of assisting the rotation of the steering wheel 2 is increased) with the increase of the steering torque Ts, and the basic assist amount is decreased with the increase of the vehicle speed V.

The vehicle-speed gain calculation section 26 serves as a map in which gain is correlated to vehicle speed, and outputs a gain according to the vehicle speed detected by the vehicle sensor 11. Specifically, a larger gain is ensured to be output with a higher vehicle speed. Accordingly, when the steering wheel is returned to its neutral position, a higher vehicle speed can more suppress the motor speed.

The assist compensation amount calculation section 24 calculates an assist compensation amount. The assist compensation amount corrects the basic assist amount calculated by the basic assist amount calculation section 21. The assist compensation amount calculation section 24 calculates the assist compensation amount such that the characteristics of the entire electric power steering system 1 can meet both of a forward input specification and a reverse input specification set forth below.

The forward input refers to an input from a steering-wheel side. The forward input specification refers to a specification in which the characteristics of transmitting the steering wheel torque to a road surface in the electric power steering system 1 do not change (or if they do change, only by a small amount) from those in the case where the motor 6 is driven with no correction of the basic assist amount by the assist compensation amount.

On the other hand, the reverse input refers to an input from a road-surface side. The reverse input specification refers to a specification in which signal components in a preset frequency range of the road-surface input torque in the electric power steering system 1 are transmitted more to the steering wheel 2 than in the case where the motor 6 is driven with no correction of the basic assist amount by the assist compensation amount.

In this way, as disclosed in Patent Literature 2, two kinds of input signals are required in order to meet both of the forward and reverse input specifications. In this regard, the present embodiment uses two signals of the steering torque Ts and the motor speed $\omega$, as the input signals.

There are various methods of designing a two-input one-output controller. For example, a controller, i.e. the assist compensation amount calculation section 24, can be designed using, similar to Patent Literature 2, the H-$\infty$ (H-infinity) control theory. The method of designing a controller using the H-$\infty$ control is well known. Further, Patent Literature 2 discloses in detail a method of designing an assist compensation amount calculation section under the H-$\infty$ control so as to meet both of a first specification and a second specification. Accordingly, the present embodiment shows only the forward and reverse input specifications. It should be noted that, besides the design method using the H-$\infty$ control theory, other known design methods, such as a $\mu$ design, may be used for designing the assist compensation amount calculation section 24.

Figure 2:
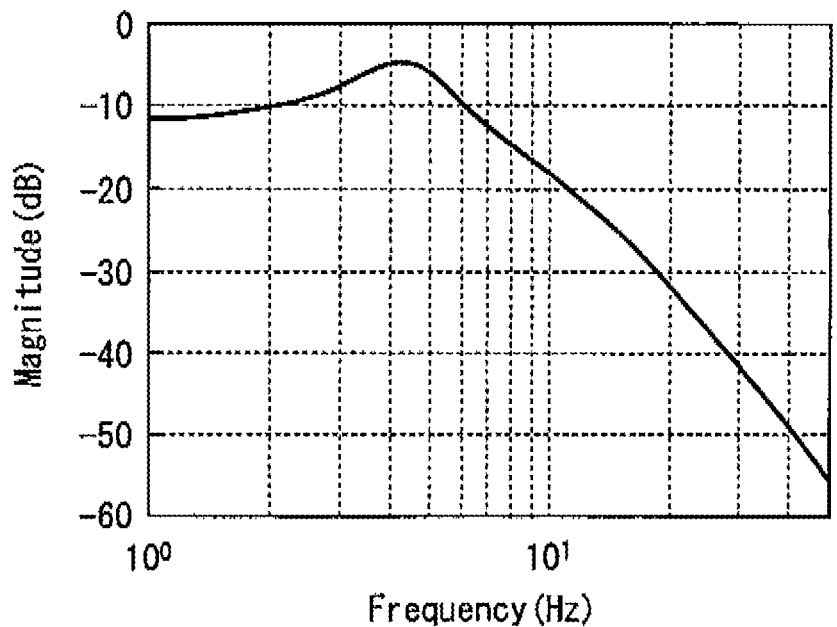
FIG. 2 is a Bode diagram illustrating characteristics of torque transmission from a steering wheel to a road surface, in the electric power steering system according to a first embodiment.
Figure 3:
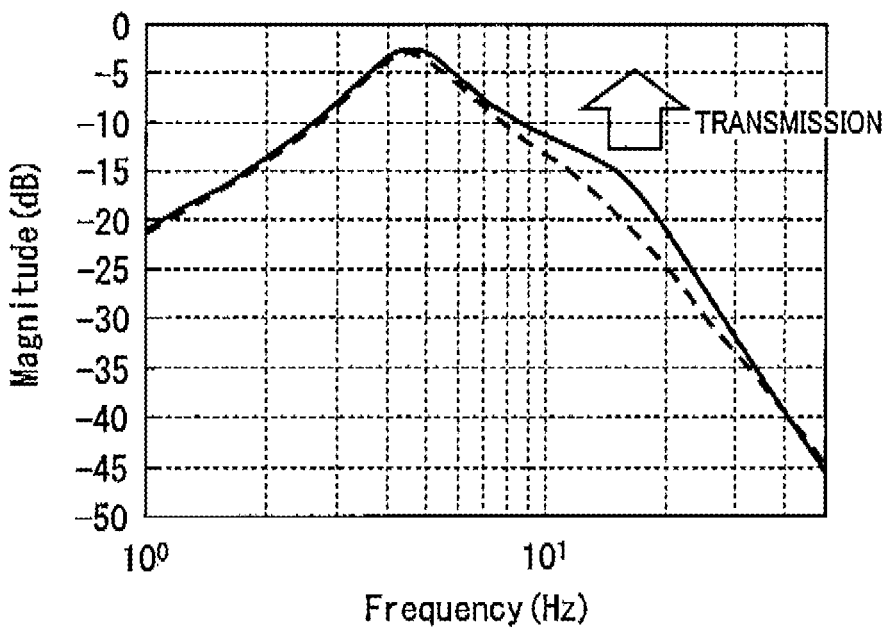
FIG. 3 is a Bode diagram illustrating characteristics of torque transmission from a road surface to a steering wheel, in the electric power steering system according to the first embodiment.

FIGS. 2 and 3 show torque transmission characteristics of the electric power steering system 1. FIG. 2 is a Bode diagram illustrating transmission characteristics of the torque transmitted from the steering wheel 2 to a road surface (hereinafter referred to as forward input torque transmission characteristics). In contrast, FIG. 3 is a Bode diagram illustrating transmission characteristics of the torque transmitted from a road surface to the steering wheel 2 (hereinafter referred to as road-surface input torque transmission characteristics or reverse input torque transmission characteristics). In both of FIGS. 2 and 3, the solid line indicates the transmission characteristics according to the present embodiment, while the dashed line indicates the transmission characteristics in the case where torque is input as it is into the motor drive circuit 22 with no correction of the basic assist amount.

In FIG. 2, the solid line and the dashed line are mostly overlapped with each other. Accordingly, the forward input torque transmission characteristics of the present embodiment are substantially the same as the characteristics in the case where the motor 6 is driven with no correction of the basic assist amount by the assist compensation amount (hereinafter referred to as a characteristic of only basic assist amounts).

On the other hand, in FIG. 3 showing the reverse input torque transmission characteristics, the solid line covering 7 to 40 Hz indicates a larger intensity than the dashed line. In other words, in the reverse input torque transmission characteristics, vibrational components of 7 to 40 Hz of the torque, which are input from a direction of the road surface, are transmitted being more amplified than in the characteristic of only basic assist amounts.

The assist compensation amount calculation section 24 is designed using a known method, which is based such as on the H-∞ control theory (i.e., H-infinity control theory) mentioned above, so that these inverse input torque transmission characteristics are met.

In the conventional art, the road-surface input torque has been considered to be a transmission that is not necessary for manipulating the steering wheel 2. However, as described above, according to the findings of the inventors of the present invention, a driver habitually manipulates the steering wheel, feeling the grip between the road surface and the tires or feeling the states of the vehicle body, such as vibration of the vehicle body, from the torque that is transmitted from the road surface side to the steering wheel 2.

Therefore, as shown in FIG. 3, the present embodiment provides characteristics in which the signal components covering 7 to 40 Hz of the road-surface input torque are more transmitted to the steering wheel 2 side than in the characteristic of only basic assist amounts.

Further, the assist compensation amount calculation section 24 of the present embodiment calculates an assist compensation amount suitable for a vehicle-state value, in order to cope with the variation in the reverse input torque transmission characteristics of the electric power steering system 1, the variation being attributed to the variation in the vehicle-state value. Thus, under the conditions that the vehicle-state value varies, the frequency at a resonance point (also referred to as pole) is suppressed from being varied in the reverse input torque transmission characteristics.

The vehicle-state value that influences the reverse input torque transmission characteristics includes, for example, the steering torque Ts, the vehicle speed V, the motor speed ω, the motor rotational angle, or the steering state of the steering wheel 2 (whether the steering wheel is being turned or being returned). In the present embodiment, an assist compensation amount suitable for the steering torque Ts is calculated.

Figure 4:
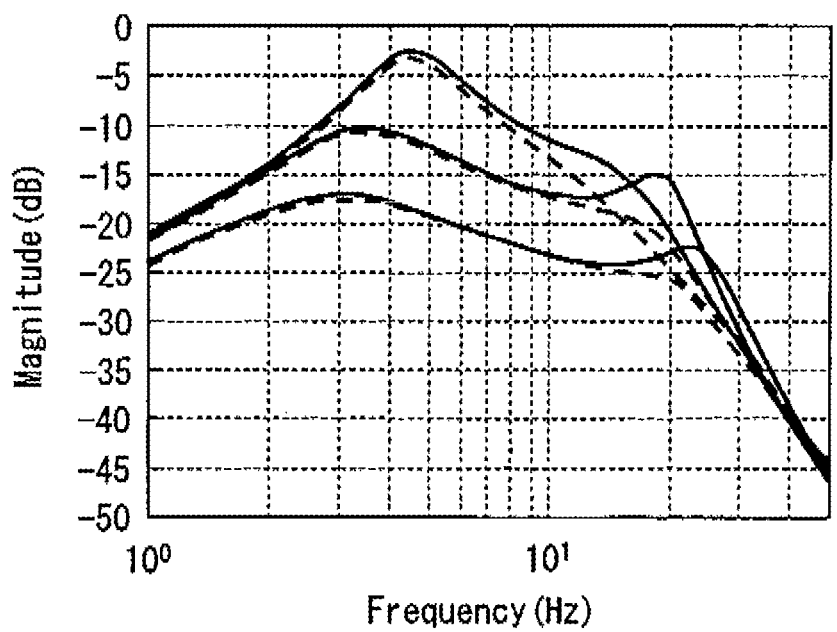
FIG. 4 is a Bode diagram illustrating characteristics of torque transmission from a road surface to a steering wheel in a comparative example for comparison with the first embodiment.

FIG. 4 shows a Bode diagram of a comparative example in which the dashed line indicates a characteristic of only basic assist amounts. On the other hand, the solid line indicates the case where control is exerted on the basis of a corrected assist amount that is obtained by correction of a basic assist amount by an assist compensation amount. In other words, the solid line indicates the case where an unchanged assist compensation amount calculation section 24 (hereinafter may also be referred to as unchanged controller) is used, irrespective of the variation of the steering torque Ts. It should be noted that the term unchanged herein refers to that the specific values including coefficients or constants remain unchanged.

In FIG. 4, the difference between a plurality of sets of solid and dashed lines is the input steering torque Ts. Thus, as will be understood from FIG. 4, use of an unchanged controller causes alteration in the frequency at a resonance point, due to the difference in the input steering torque Ts.

In this regard, the assist compensation amount calculation section 24 of the present embodiment calculates an assist compensation amount that can suppress the alteration at the resonance point in the case where the steering torque Ts varies.

Figure 5:
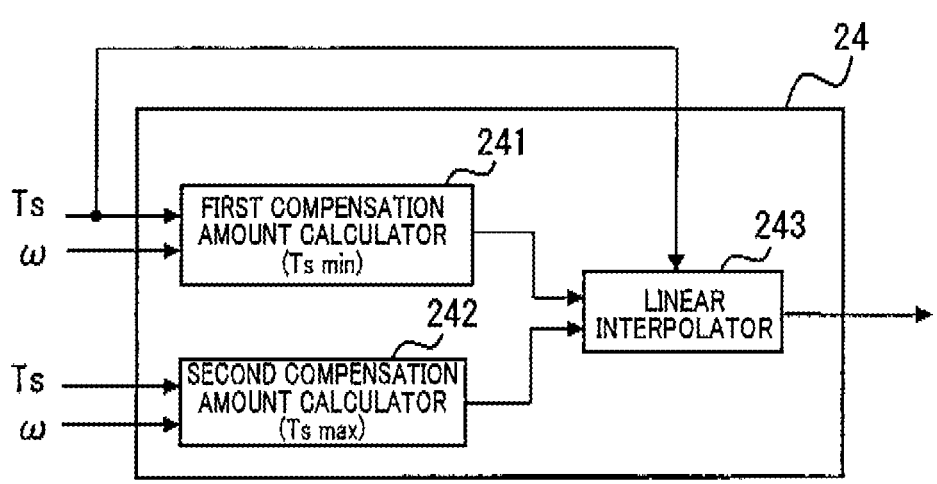
FIG. 5 is a block diagram illustrating an assist compensation amount calculation section, according to the first embodiment.

As shown in FIG. 5, the assist compensation amount calculation section 24 of the present embodiment includes a first compensation amount calculator 241, a second compensation amount calculator 242, and a linear interpolator 243.

The first compensation amount calculator 241 is designed to ensure calculation of an assist compensation amount that meets the forward and reverse input specifications, with the steering torque Ts as being a predetermined minimum value (hereinafter referred to as a first assist compensation amount). On the other hand, the second compensation amount calculator 242 is designed to ensure calculation of an assist compensation amount that meets the forward and reverse input specifications, with the steering torque Ts as being a predetermined maximum value (hereinafter referred to as a second assist compensation amount). It should be noted that the first and second compensation amount calculators 241 and 242 can be designed using a method similar to the one used for the assist compensation amount calculation section 24 of the first embodiment.

The linear interpolator 243 receives an input of the steering torque detected by the torque sensor 4, i.e. an input of the actual steering torque Ts, and also receives inputs of the first and second assist compensation amounts. The linear interpolator 243 linearly interpolates the first and second assist compensation amounts according to the actual steering torque Ts to calculate an assist compensation amount in the actual steering torque Ts.

The linear interpolation is more specifically described. For example, the first assist compensation amount is ensured to be multiplied with a coefficient α (0≤α≤1), while the second assist compensation amount is ensured to be multiplied with 1-α. Then, a value of α is determined according to the actual steering torque Ts. The value of α is α=0 when the steering torque Ts has a minimum value, and α=1 when the steering torque Ts has a maximum value. When the steering torque has an in-between value, the value of α is calculated by dividing a difference Δtrue between the actual steering torque Ts and the minimum value, by a difference Δmax between the maximum value and the minimum value of the steering torque Ts. Thus, by determining the value of α in conformity with the actual steering torque Ts, the assist compensation amount calculation section 24 (controller), when considered including the value of α, is virtually used as different controllers depending on the actual steering torque Ts.

Figure 6:
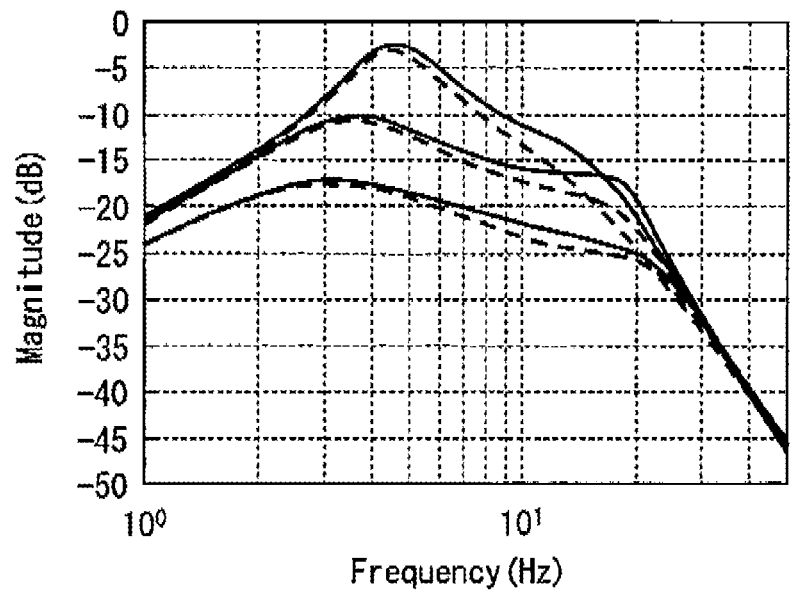
FIG. 6 illustrates transmission characteristics of road-surface input torque in the embodiment that uses the assist compensation amount calculation section illustrated in FIG. 5.

FIG. 6 shows reverse input torque transmission characteristics of the present embodiment. In FIG. 6, what are indicated by the plurality of dashed and solid lines, and the conditions on which the plurality of sets of dashed and solid lines are based are the same as those of FIG. 4.

In FIG. 6, there is almost no difference between the frequencies at the resonance points of the plurality of solid lines. Specifically, in the present embodiment, it will be seen that, in spite of the variation in the steering torque Ts that is a value giving influences to the reverse input torque transmission characteristics, alteration is suppressed in the frequencies at the resonance points in the reverse input torque transmission characteristics.

According to the first embodiment described above, the assist compensation amount calculation section 24 uses two kinds of signals of the steering torque Ts and the motor speed ω, as input signals. Owing to this, a reverse input specification is ensured to be designed without giving an influence to the forward input specification, and the reverse input specification designed in this way ensures more transmission of the road-surface input torque.

In this way, the driver is able to easily manipulate the steering wheel, while feeling the grip between the road surface and the tires, or feeling the states of the vehicle body, such as vibration of the vehicle body, from the steering wheel.

Moreover, the assist compensation amount calculations section 24 calculates an assist compensation amount suitable for the steering torque Ts, in order to suppress the frequency alteration at the resonance point, which is attributed to the variation in the steering torque Ts, in the reverse input torque transmission characteristics of the electric power steering system 1.

Accordingly, the grip between the road surface and the tires or the states of the vehicle body, which can be felt through the steering wheel 2, are prevented from being varied due to the variation of the steering torque Ts. Thus, steering is more facilitated.

Second Embodiment

Subsequently, a second embodiment is described. It should be noted that, in the second and the subsequent embodiments, those components which have reference numbers identical with those used in the preceding embodiments are identical with the respective components of the preceding embodiments as far as no particular mention is made. Further, when a configuration is described only partially, the rest of the configuration can be supplied from a previously described embodiment.

The difference between the second and first embodiments lies in the configuration of the assist compensation amount calculation section (reference 24A is used in the second embodiment).

Figure 7:
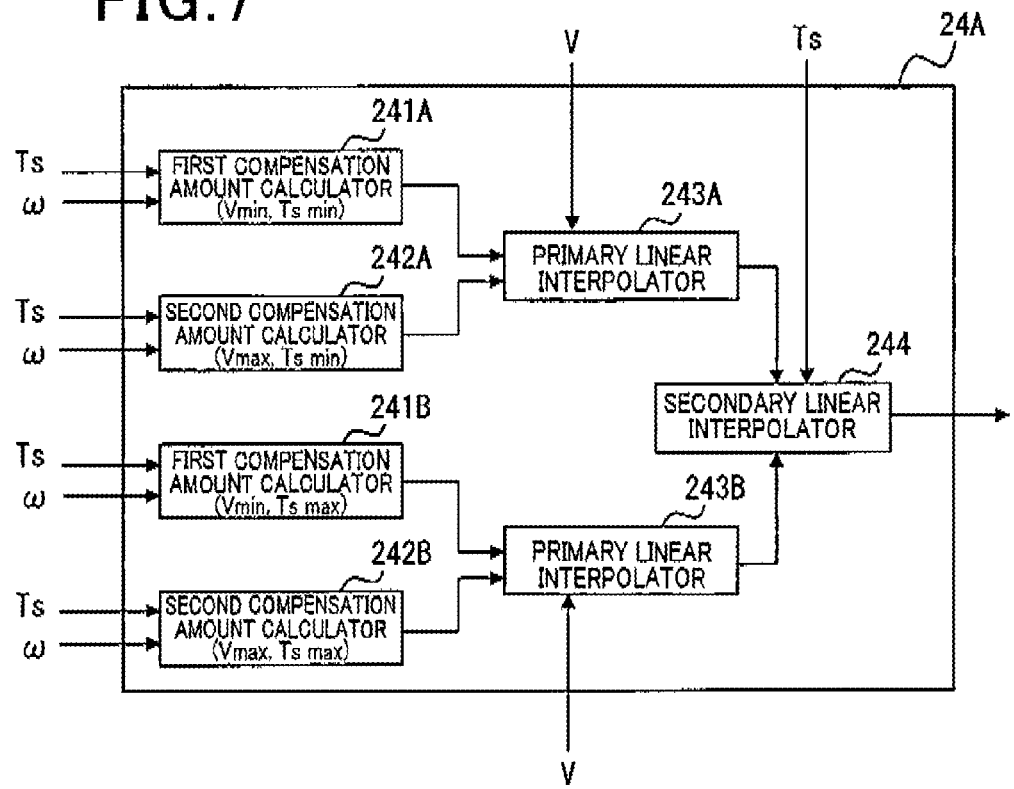
FIG. 7 is a block diagram illustrating an assist compensation amount calculation section, according to a second embodiment.

The assist compensation amount calculation section 24A shown in FIG. 7 suppresses variation in the frequency characteristics of reverse transmission torque, which are attributed to two vehicle-state values that are the steering torque Ts and the vehicle speed V. For the suppression, a coefficient α used in primary linear interpolators 243A and 243B and a coefficient β used in a secondary linear interpolator 244 are adjusted according to the steering torque Ts and the vehicle speed V.

Other than the primary linear interpolators 243A and 243B and the secondary linear interpolator 244, the assist compensation amount calculation section 24A includes two first compensation amount calculators 241A and 241B, and two second compensation amount calculators 242A and 242B, whose number corresponds to the number of the vehicle-state values.

The first and second compensation amount calculators 241A and 242A are designed to ensure calculation of assist compensation amounts (a first assist compensation amount and a second assist compensation amount) that satisfy a forward input specification and a reverse input specification, respectively. In the calculation, the steering torque Ts is a predetermined minimum value in both of the first and second compensation amount calculators 241A and 242A, and the vehicle speed V is a predetermined minimum value in the first compensation amount calculator 241A and is a predetermined maximum value in the second compensation amount calculator 242A.

The first and second compensation calculators 241A and 242A are different from the first and second compensation amount calculators 241B and 242B only in that the steering torque Ts in the latter is a maximum value.

The primary linear interpolators 243A and 243B each have a function similar to that of the linear interpolator 243 of the first embodiment, except that the primary linear interpolators 243A and 243B each use the vehicle speed V in place of the steering torque Ts, as a vehicle-state value for determining a value of the coefficient α. Thus, both of the primary linear interpolators 243A and 243B calculate the respective assist compensation amounts.

Similar to the linear interpolator 243 of the first embodiment, the secondary linear interpolator 244 determines a value of the coefficient (β herein) on the basis of a value of the steering torque Ts. The secondary linear interpolator 244 carries out a process similar to that of the linear interpolator 243 of the first embodiment, except that, in the secondary linear interpolator 244, the coefficient is β and the assist compensation amounts as inputs are the values calculated by the primary linear interpolators 243A and 243B. Through the process, a final assist compensation amount is calculated and the calculated assist compensation amount is output to the adder 25.

With the configuration of the second embodiment, the variation attributed to the two vehicle-state values of the steering torque Ts and the vehicle speed V can be advantageously suppressed in the frequency characteristics of reverse transmission torque, in addition to the advantageous effects of the first embodiment.

Applying the idea of the second embodiment, the variation attributed to three or more vehicle-state values may be suppressed in the frequency characteristics of reverse transmission torque.

Third Embodiment

In a third embodiment as well, a difference from the foregoing embodiments lies in the assist compensation amount calculation section (reference 24B is used in the third embodiment).

Figure 8:
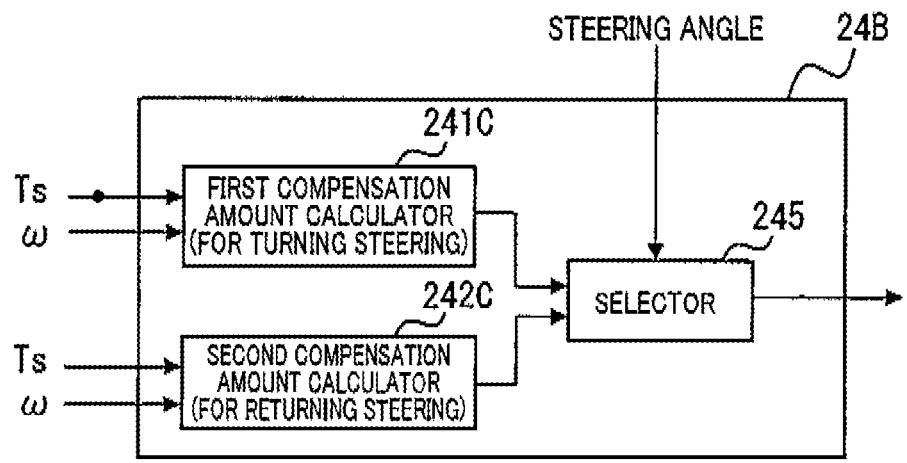
FIG. 8 is a block diagram illustrating an assist compensation amount calculation section, according to a third embodiment.

As shown in FIG. 8, the assist compensation amount calculations section 24B of the third embodiment includes a first compensation amount calculator 241C, a second compensation amount calculator 242C and a selector 245.

The first compensation amount calculator 241C is designed to ensure calculation of an assist compensation amount that meets the forward and reverse input specifications, in a state where the steering wheel 2 is being turned in a steering turning direction thereof.

In contrast, the second compensation amount calculator 242C is designed to ensure calculation of an assist compensation amount that meets the forward and reverse input specifications, in a state where the steering wheel 2 is being turned in a steering returning direction thereof.

The selector 245 sequentially receives an input of a signal which is indicative of a steering angle. Based on the signal, it is determined whether the steering wheel 2 is in a state of being turned in a steering turning direction (started to turning the steering or additionally turning the steering) or in a state of being turned in a steering returning direction. Then, if the steering wheel 2 is in a state of being turned in the positive steering direction, an assist compensation amount calculated by the first compensation amount calculator 241C is output to the adder 25. On the other hand, if the steering wheel 2 is in a state of being turned in the negative steering direction, an assist compensation amount calculated by the second compensation amount calculator 242C is output to the adder 25. It should be noted that whether the steering wheel 2 is in a state of being turned in the positive steering direction or the negative steering direction may be determined on the basis of a signal other than the steering angle (e.g., a signal indicative of a tire steering angle).

Whether the steering wheel 2 is in a state of being turned in the positive steering direction or in the negative steering direction also influences the reverse torque transmission characteristics of the electric power steering system 1.

However, the assist compensation amount calculation section 24B of the third embodiment is provided with the first and second compensation amount calculators 241C and 242C that meet the forward and reverse input specifications, in respect of the states where the steering wheel 2 is being turned in the positive steering direction and in the negative steering direction, respectively. Then, depending on whether the steering wheel 2 is in a state of being turned in the positive or negative steering direction, an assist compensation amount to be output to the adder 25 is selected.

Accordingly, the grip between a road surface and the tires, and the states of the vehicle body, which are felt from the steering wheel 2 are suppressed from being varied due to whether the steering wheel 2 is being positively steered or negatively steered.

Fourth Embodiment

In a fourth embodiment, the EPSECU 20 acquires a signal of a brake switch and determines on/off of the brake on the basis of the signal.

Figure 9:
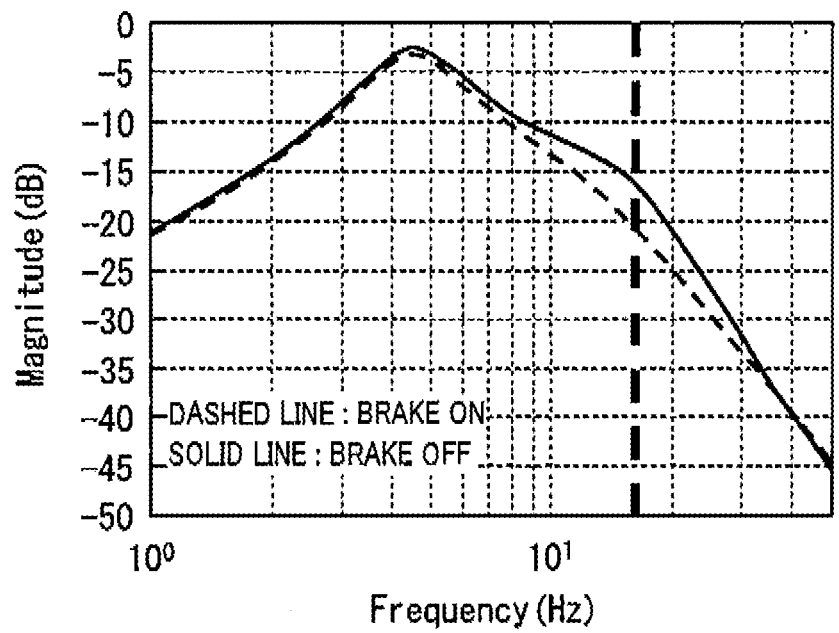
FIG. 9 is a Bode diagram illustrating transmission characteristics of road-surface input torque, according to a fourth embodiment.

In FIG. 9, the dashed line indicates reverse input torque transmission characteristics of the system 1 when the brake is in an on-state. The dashed line indicates transmission characteristics when motor control is exerted on the basis of only a basic assist amount. In other words, in the fourth embodiment, the motor control is exerted on the basis of only a basic assist amount when the brake is in an on-state.

The solid line shown in FIG. 9 indicates forward input torque transmission characteristics of the system 1 when the brake is in an off-state, the solid line indicating the same characteristics as the ones indicated by the solid line in FIG. 3. Specifically, in the fourth embodiment, when the brake is in an off-state, an assist compensation amount is calculated and a basic assist amount is corrected by the assist compensation amount to exert motor control on the basis of the corrected assist compensation amount. In the fourth embodiment as well, as a matter of course, the controller is permitted to be different according to the vehicle-state values or the states of the steering wheel 2, as in the embodiments described above.

When braking is applied, vibration occurs in the vehicle body being induced by the braking, the vibration occurring at an unsprung resonance frequency (near 15 to 20 Hz). The vertical dashed line shown in FIG. 9 exemplifies the unsprung resonance frequency.

A brake vibration occurs in a frequency band centering on the frequency indicated by the dashed line in FIG. 9. Accordingly, when the transmission characteristics indicated by the solid line in FIG. 9 are exhibited at the time of applying braking, the brake vibration is easily transmitted to the steering wheel 2.

However, in the fourth embodiment, motor control is performed on the basis of only a basic assist amount when braking is applied, thereby creating the transmission characteristics indicated by the dashed line in FIG. 9.

Accordingly, while the advantageous effects described in the first to third embodiment are enjoyed, the vibration at the time of applying braking is suppressed from being transmitted to the steering wheel 2.

Fifth Embodiment

In a fifth embodiment as well, reverse input torque transmission characteristics are varied to suppress the vibration at the time of applying braking. However, while the transmission characteristics are switched on the basis of only whether the brake is in an on-state or in an off-state in the fourth embodiment, reverse input torque transmission characteristics in the fifth embodiment are adjusted according to a flow diagram shown in FIG. 10.

Figure 10:
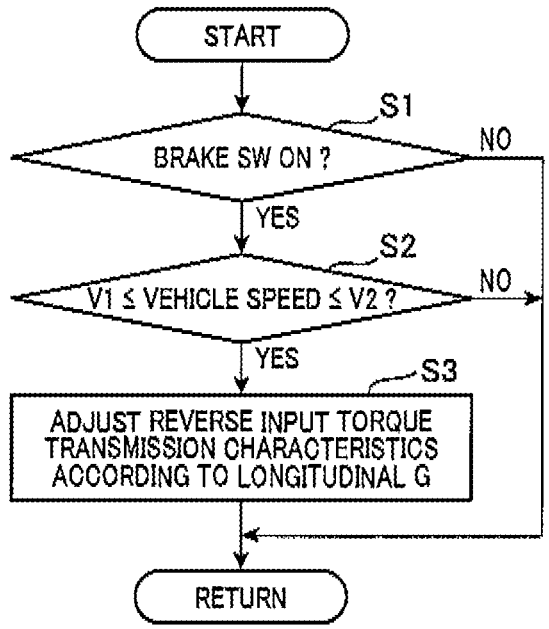
FIG. 10 is a flow chart illustrating a process that is executed to adjust transmission characteristics of road-surface input torque, according to a fifth embodiment.

The flow chart shown in FIG. 10 is cyclically performed by a CPU, not shown, provided to the EPSECU 20. At step S1, it is determined whether the brake switch is in an on-state. If the determination is NO, the process of FIG. 10 is terminated. On the other hand, if YES, control proceeds to step S2 where it is determined whether the vehicle speed V is not less than V1 but not more than V2.

The reason why this determination is made is that a brake vibration chiefly occurs in a middle- to high-speed range. Accordingly, V1 and V2 indicate upper and lower limits, respectively, of the middle- to high-speed range in which the brake vibration occurs. The specific values are determined on the basis of an experiment or the like and set in advance.

When a determination at step S2 is NO as well, the process of FIG. 10 is terminated. On the other hand, if YES, control proceeds to step S3. At step S3, reverse input torque transmission characteristics are adjusted according to a longitudinal G of the vehicle.

Figure 11:
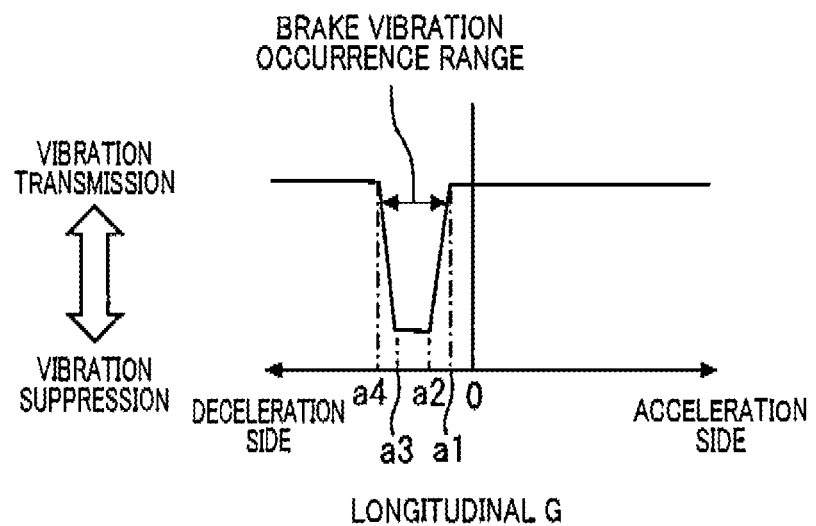
FIG. 11 is a diagram illustrating a range of longitudinal G that causes brake vibration.

As shown in FIG. 11, a brake vibration occurs in slow braking. Thus, when the longitudinal G of the vehicle is in a range of a1 to a4 shown in FIG. 11, an assist compensation amount that can suppress the brake vibration is calculated.

For example, when the longitudinal G is in a2 to a3, control is changed from the one transmitting the vibration to the one suppressing the vibration. When the longitudinal G is in a range of a1 to a2 or a3 to a4, a vibration suppression which is determined according to a specific longitudinal G is carried out. As have been described in the foregoing embodiments, in a normal state (when the determination at step S1 or S2 is NO in the present embodiment), transmission characteristics are exhibited such that reverse input torque is transmitted being amplified. Accordingly, vibration suppression herein refers to the degree of amplification in the range 7 to 40 Hz being lowered in the reverse input torque transmission characteristics.

Various methods can be enumerated for lowering the degree of amplification. For example, according to a method, a gain of not more than 1 is determined according to a specific longitudinal G within the range of a1 to a2 or a3 to a4, and the gain is multiplied with an assist compensation amount of a normal state.

In a state where the brake vibration is suppressed from being transmitted to the steering wheel 2, a road-surface input torque is also suppressed from being transmitted to the steering wheel 2. However, according to the fifth embodiment, the occasions of suppressing the brake vibration is more limited than in the fourth embodiment. Accordingly, the occasions of suppressing transmission of road-surface input torque to the steering wheel 2 are also limited. Thus, in the fifth embodiment, while the brake vibration is suppressed from being transmitted to the steering wheel 2, transmission of the grip between a road surface and the tires, and the vehicle states, which are transmitted to and felt through the steering wheel 2, is prevented from being excessively suppressed.

Sixth Embodiment

Figure 12:
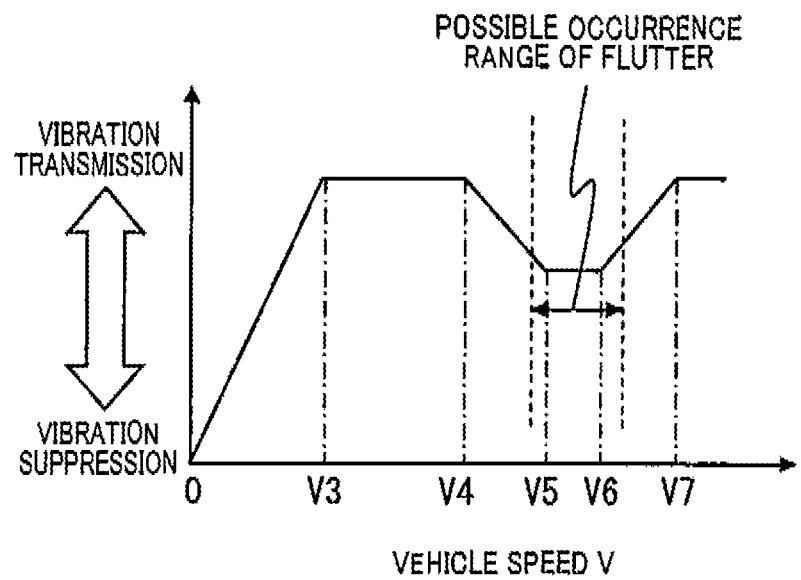
FIG. 12 is a diagram illustrating a relationship between vehicle speed and adjustment of transmission characteristics of road-surface input torque, according to a sixth embodiment.

In a sixth embodiment, transmission characteristics for reverse input torque are adjusted using a graph shown in FIG. 12.

In FIG. 12, a vehicle speed V3 has comparatively a small value. A steering wheel manipulation, when performed in a range of vehicle speed 0 to V3, can be regarded to be nearly stationary steering. Vehicle speed 0 to V3 corresponds to the stationary-state vehicle speed range of the claims.

In stationary steering, the driver's manipulation speed of the steering wheel is fast and the steering wheel torque that is input by the driver is large. Further, since the load of the motor 6 is also large, an unusual noise and vibration are easily caused. Moreover, there is a low necessity of transmitting the grip between a road surface and the tires.

In this regard, in a range of the vehicle speed 0 to V3, the control for suppressing vibration is more exerted than in a normal state (vehicle speed is V3 to V4 or more than V7 in the sixth embodiment). The term "suppressing vibration" herein is used in the same way as in the fifth embodiment, and thus refers to lowering the degree of amplification of 7 to 40 Hz in reverse input torque transmission characteristics.

Further, as shown in FIG. 12, vibration suppression is also performed at vehicle speed V4 to V7. The vehicle speed V4 to V7 corresponds to the flutter-causing vehicle speed range of the claims. The flutter corresponds to a state where the tires are unbalanced. The flutter is caused when the primary frequency of a tire rotation signal is close to the unsprung frequency. The primary frequency of a tire rotation signal is proportionate to the vehicle speed V. Accordingly, control for suppressing vibration is conducted in the vehicle speed range (V4 to V7) as well that includes a range in which flutter vibration can occur. It should be noted that, in conducting the control for suppressing vibration, a degree of suppressing vibration is determined on the basis of a specific vehicle speed. In making the determination, a method similar to the one used in the fifth embodiment is used, that is the method in which the degree of suppressing vibration is determined according to a specific longitudinal G.

With the configuration of the sixth embodiment, the vibration occurring in the stationary steering or the vibration due to flutter is suppressed from being transmitted to the steering wheel 2.

Seventh Embodiment

Figure 13:
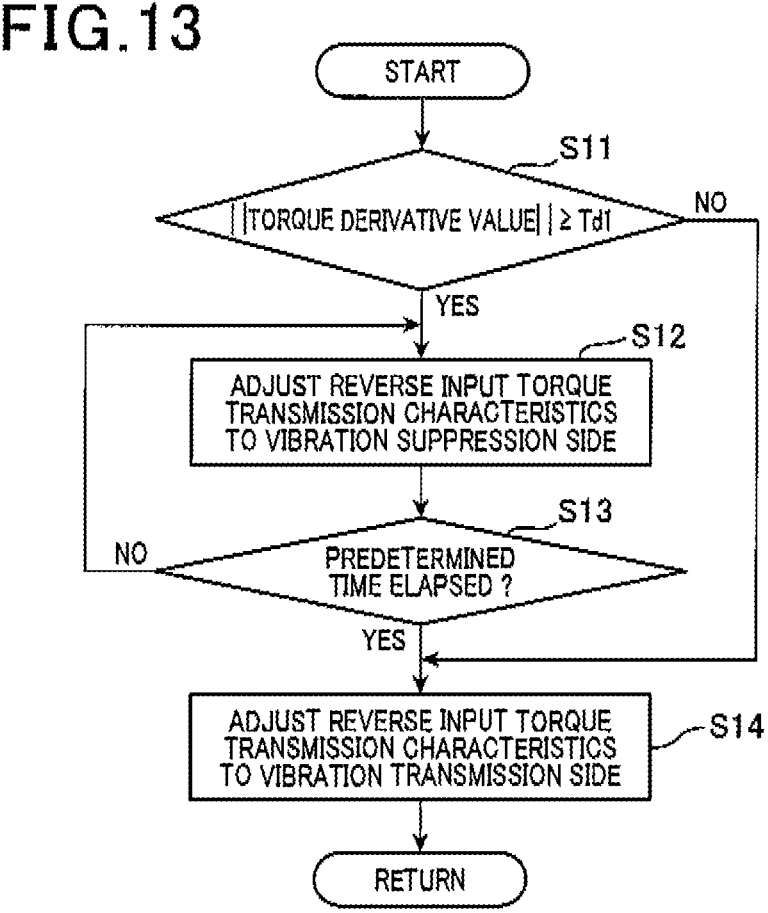
FIG. 13 is a flow chart illustrating a process for adjusting transmission characteristics of road-surface input torque, according to a seventh embodiment.

In a seventh embodiment, reverse input torque transmission characteristics are adjusted according to a flow chart shown in FIG. 13.

At step S11 of FIG. 13, using a torque derivative value as an impact reflected value, it is determined whether or not an absolute value of the torque derivative value is Td1 or more. The torque herein is detected by the torque sensor 4. The reference symbol Td1 indicates a threshold to which a specific value is set in advance. The determination is made for a large impact, such as a kickback, that is an input from a road surface.

If the determination is NO, control proceeds to step S14, and if YES, control proceeds to step S12. At step S12, reverse input torque transmission characteristics are switched to a vibration suppression side. For example, motor control is exerted on the basis of only a basic assist described in the foregoing embodiment.

At step S13, it is determined whether or not a predetermined time (e.g., several seconds) has elapsed from when the reverse input torque transmission characteristics have been adjusted to a vibration suppression side at step S12. If the determination is NO, control returns to step S12 to keep the state where the reverse input torque transmission characteristics are on a vibration suppression side.

On the other hand, if it is determined, at step S13, that the predetermined time has elapsed, control proceeds to step S14 where the reverse input torque transmission characteristics are switched to a vibration transmission side. The reverse input torque on a vibration transmission side, for example, has the characteristics indicated by the solid lines in FIG. 6.

Figure 14:
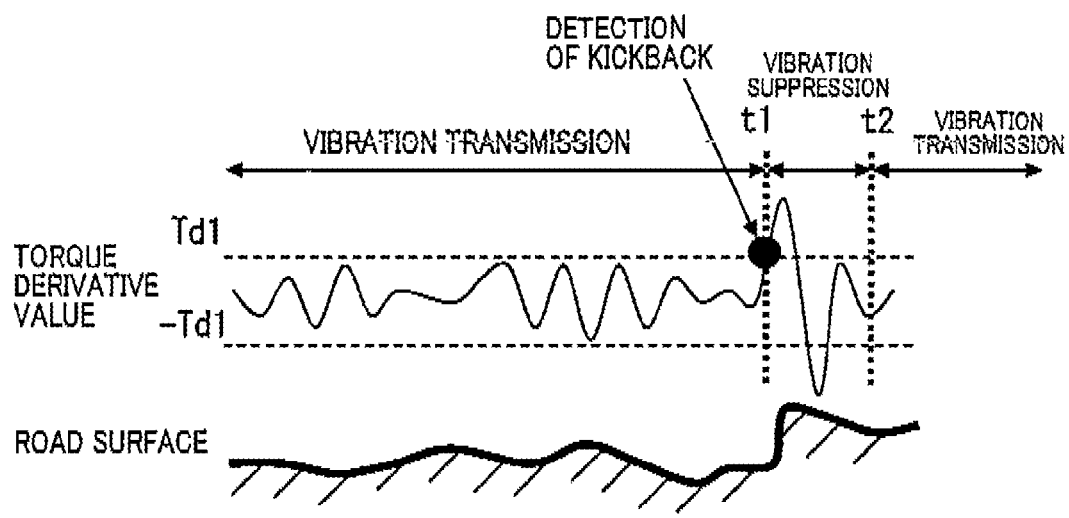
FIG. 14 is a diagram exemplifying timing of switching transmission characteristics of road-surface input torque, according to the seventh embodiment.

In an example shown in FIG. 14, the torque derivative value is in a range of −Td1 to Td1 until a time point t1, and accordingly, the determination at step S11 is NO. Accordingly, the reverse torque transmission characteristics are switched to a vibration transmission side.

At time point t1, the torque derivative value exceeds Td1 due to an impact caused by a large step on a road surface. Thus, at this time point, the determination at step S11 turns to YES. Accordingly, from time point t1 onward, the reverse input torque transmission characteristics are switched to a vibration suppression side.

Then, at time point t2 after lapse of the predetermined time from time point t1, the determination at step S13 turns to YES and thus the reverse input torque transmission characteristics are again switched back to a vibration transmission side. It should be noted that the reason why the transmission characteristics are switched after lapse of a predetermined time is that a large impact, such as kickback, is singly input, being induced such as by a road surface step, and that, due to the very short duration of the impact, the vibration caused by the impact is considered to be converged after lapse of the predetermined time.

According to the seventh embodiment, when a large impact, such as kickback, is caused, the vibration due to the impact can be suppressed from being transmitted to the steering wheel 2.

Eighth Embodiment

Figure 15:
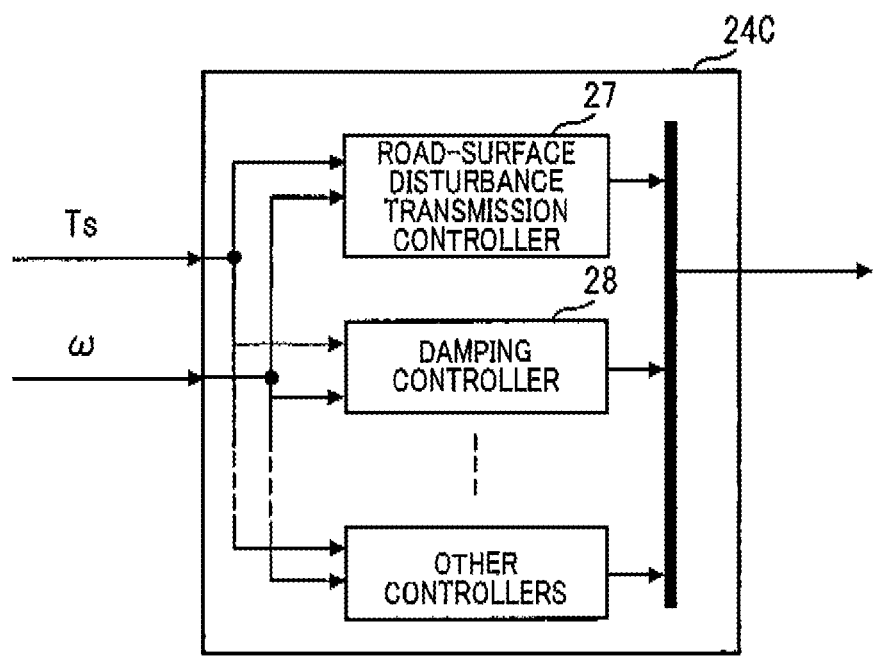
FIG. 15 is a diagram illustrating a configuration of an electric power steering system, according to an eighth embodiment.

As shown in FIG. 15, in an eighth embodiment, an assist compensation amount calculation section 24C is configured to include a road-surface disturbance transmission controller 27 and a damping controller 28. Other than these, the assist compensation amount calculation section 24C may include other known controllers each of which calculates an assist compensation amount. It should be noted that the configuration other than the assist compensation amount calculation section 24C is similar to that shown in FIG. 1.

The road-surface disturbance transmission controller 27 has a function of any of the assist compensation amount calculation sections 24, 24A and 24B described in the foregoing plurality of embodiments.

The damping controller 28 calculates a damping compensation amount on the basis of the motor speed ω. Specifically, the damping compensation amount is calculated such that the higher the motor speed ω is (i.e. as the steering wheel 2 is rotated faster), the more the speed is suppressed (i.e. the rotational speed of the steering wheel 2 is more suppressed).

Various control methods have been suggested and put into practice for the damping control in an electric power steering system. Therefore, description on the calculation of a damping compensation amount is omitted, and focus is put only on a characteristic process of the present embodiment.

An assist compensation amount calculated by the road-surface disturbance transmission controller 27 switches the reverse input torque transmission characteristics to a transmission suppression side to thereby suppress the road-surface input torque from being transmitted to the steering wheel 2. When such an assist compensation amount is calculated by the road-surface disturbance transmission controller 27, the damping controller 28 allows a damping compensation amount to be larger than a value that is determined based on the motor speed ω. The damping compensation amount and the values calculated by the road-surface disturbance transmission controller 27 and other controllers are multiplexed and output to the adder 25.

Under the damping control, the speed ω of the motor 6 is attenuated according to the motor speed, and has a major purpose of ensuring convergency in the steering wheel 2 or imparting a resistance to the steering manipulation. However, the damping control, which gives attenuation to the motor speed, also exerts an effect of suppressing vibration.

Accordingly, when the road-surface input torque characteristics are switched to a vibration suppression side by the road-surface disturbance transmission controller 27, concurrent use of the damping control further improves the vibration suppression effect.

Further, when the damping control is concurrently used, the degree of vibration transmission suppression depending on an assist compensation amount may be lowered according to the damping compensation amount.

Several embodiments of the present invention have so far been described. However, the present invention should not be construed as being limited to the foregoing embodiments, but the following embodiments may also be included in the technical feature of the present invention. Further, besides the following embodiments, the present invention may be variously modified and implemented within a scope not departing from the spirit of the present invention.

Modification 1

In the seventh embodiment, the occurrence of a large impact, such as kickback, is detected using a torque derivative value. However, alternative to the torque derivative value, the motor speed ω or a rotational acceleration of the motor may be used to ensure detection of the occurrence of an impact. In other words, the motor speed ω or the rotational acceleration of the motor may be used as an impact reflected value.

As a specific example of a determination method using these values, for example, the occurrence of an impact is determined under the condition that relations concerning absolute values: $|ω| ≥ threshold$; and $|Rotational\ acceleration\ of\ motor| ≥ threshold$, are met.

Modification 2

Alternative to the longitudinal G of the fifth embodiment, time variation of suspension stroke, time variation of the stroke of a brake cylinder, and time variation of vehicle speed may be used as bases to adjust the reverse input torque characteristics. This is because these variations are also acceleration correlation values which vary in relation to the longitudinal acceleration of the vehicle.

Modification 3

Further, alternative to the motor speed ω, a motor angle (i.e. motor rotational position) may be used as the signal that is input to the assist compensation amount calculation section 24.

Further, any signal (however, at least two kinds of signals) which affects the operation/behavior of the electric power steering system 1 may be used as the signal that is input to the assist compensation amount calculation section 24.

Specifically, for example, the signals that can be used include those of the rotational angle of the steering wheel 2, the rotational speed of the steering wheel 2, the torque of the intermediate shaft 5, the stroke (movement in the right-and-left direction) of the rack constituting the steering gear box 7, the thrust force of the rack, and the angles of the tires 10. It should be noted that, the angle, the torque, the thrust force, or the like may be directly detected, or may be estimated from another signal as in the case of the motor speed w described in the first embodiment.

Further, of the signals mentioned above, the steering torque Ts, the rotational angle of the steering wheel 2, and the rotational speed of the steering wheel 2, in particular, can be the signals to which the torque that is input by the driver to the steering wheel 2 is reflected. On the other hand, the motor speed, the motor angle, the torque of the intermediate shaft 5, the stroke of the rack, the thrust force of the rack, and the angles of the tires 10, in particular, can be the signals to which the road-surface input torque is reflected. Therefore, in calculating an assist compensation amount using any two or more kinds of signals among the various signals mentioned above, it is more preferable to use signals reflecting both of the torque that is input by the driver to the steering wheel and the road-surface input torque.

REFERENCE SIGNS LIST

1: Electric power steering system,
2: Steering wheel,
3: Steering shaft,
4: Torque sensor (torque detector),
5: Intermediate shaft,
6: Motor,
7: Gear box,
8: Tie rod,
9: Knuckle arm,
10: Tire,
11: Vehicle speed sensor,
12: Road surface,
13: Speed detector,
20: EPSECU,
21: Basic assist amount calculation section,
22: Motor drive circuit,
23: Adder,
24: Assist compensation amount calculation section,
24A: Assist compensation amount calculation section,
24B: Assist compensation amount calculation section,
24C: Assist compensation amount calculation section,
25: Multiplier,
26: Vehicle-speed gain calculation section, 241: First compensation amount calculator,
241A: First compensation amount calculator,
242: Second compensation amount calculator,
242A: First compensation amount calculator,
243: Linear interpolator,
243A: Primary linear interpolator,
243B: Primary linear interpolator,
244: Secondary linear interpolator,

What is claimed is:

1. A control apparatus provided to an electric power steering system comprising:
    an input shaft connected to a steering wheel of a vehicle and rotated together with the steering wheel, being urged by a steering wheel torque that is an input caused by manipulation of the steering wheel;
    a torque detector detecting torque applied to a torsion bar on the basis of a torsion angle of the torsion bar, the torsion bar being provided to a part of a torque transmission path for transmitting rotation of the input shaft to the steering wheel of the vehicle; and
    a motor generating an assist steering force for assisting the manipulation of the steering wheel when the steering wheel is steered by the manipulation of the steering wheel,
    the apparatus controlling the assist steering force by controlling rotation of the motor, wherein:
    the apparatus comprises:
    a basic assist amount calculation section calculating a basic assist amount for assisting the manipulation of the steering wheel on the basis of a torque detected by the torque detector;
    an assist compensation amount calculation section calculating an assist compensation amount for correcting the basic assist amount calculated by the basic assist amount calculation section;
    an assist compensation correction section calculating a corrected assist amount by correcting the basic assist amount calculated by the basic assist amount calculation section on the basis of the assist compensation amount calculated by the assist compensation amount calculation section; and
    a motor drive section driving the motor on the basis of the corrected assist amount from the assist amount correction section, and
    the assist compensation amount calculation section is configured to:
        use at least two kinds of input signals that reflect operations of the electric power steering system to calculate the assist compensation amount so as to meet both of the following specifications:
            a forward input specification corresponding to characteristics of transmitting the steering wheel torque to a road surface in the electric power steering system, the characteristics being equal to those of the case where the motor is driven with no correction of the basic assist amount by the assist compensation amount; and
            a reverse input specification corresponding to characteristics of transmitting road-surface input torque that is a force received by the steering wheel from a road surface on which the vehicle runs, in the electric power steering system, the characteristics exhibiting more transmission of the road-surface input torque to the steering wheel than in the case where the motor is driven with no correction of the basic assist amount by the assist compensation amount, and
        calculate an assist compensation amount suitable for a vehicle-state value that influences the transmission characteristics of the road-surface input torque to suppress frequency alteration at a resonance point in the transmission characteristics, the frequency alteration being attributed to variation of the vehicle state value.

2. The control apparatus according to claim 1, wherein the assist compensation amount calculation section is configured to use, as the vehicle-state value, any one or more of a vehicle speed of the vehicle, a torque detected by the torque detector, and a rotational angular speed of the motor to calculate an assist compensation amount that suppresses frequency alteration at a resonance point in the transmission characteristics of the road-surface input torque.

3. The control apparatus according to claim 1, wherein the assist compensation amount calculation section is configured to calculate a different assist compensation amount depending on whether the steering wheel is being turned or being returned to suppress frequency alteration at a resonance point in the transmission characteristics of the road-surface input torque.

4. The control apparatus according to claim 1, wherein:
    the assist compensation amount calculation section comprises:
    a first compensation amount calculator designed to calculate an assist compensation amount that meets the forward input specification and the reverse input specification, with a minimum value of the vehicle-state value; and
    a second compensation amount calculator designed to calculate an assist compensation amount that meets the forward input specification and the reverse input specification, with a maximum value of the vehicle-state value, and
    the control apparatus comprises:
    a means calculating a first assist compensation amount using an actual vehicle-state value and the first compensation amount calculator;
    a means calculating a second assist compensation amount using an actual vehicle-state value and the second compensation amount calculator; and
    a means determining an assist compensation amount with the actual vehicle-state value, by linearly interpolating the first and second compensation amounts using the maximum value, the minimum value and the actual value of the vehicle-state value.

5. The control apparatus according to claim 4, wherein:
    the assist compensation amount calculation section comprises:
    a means comprising:
    a plurality of the first compensation amount calculators that are designed for minimum values of the plurality of the vehicle-state values; and
    a plurality of the second compensation amount calculators that are designed for maximum values of the plurality of the vehicle-state values,
    the first and second compensation amount calculators being designed using the plurality of vehicle-state values,
    the apparatus comprises:
    a means for calculating a first assist compensation amount for each of the plurality of vehicle-state values, using the actual vehicle-state value and the first compensation amount calculator corresponding to the vehicle-state value;

a means for calculating a second assist compensation amount for each of the plurality of vehicle-state values, using the actual vehicle-state value and the second compensation amount calculator corresponding to the vehicle-state value; and a means for determining an assist compensation amount for the actual vehicle-state value, by linearly interpolating the first and second assist compensation amounts corresponding to each of the plurality of vehicle-state values by using the maximum value and the minimum values of the vehicle-state value, and the actual vehicle-state value.

6. The control apparatus according to claim 1, wherein the assist compensation amount calculation section is configured to calculate the assist compensation amount on the basis that a brake of the vehicle is in an on-state, to thereby switch the transmission characteristics of the road-surface input torque, to characteristics that more suppress transmission of the road-surface input torque to the steering wheel than when the brake is in an off-state.

7. The control apparatus according to claim 6, wherein the assist compensation amount is configured to calculate the assist compensation amount on the basis that the brake is in an on-state, a vehicle speed is within a predetermined middle- to high-speed range, and an acceleration correlation value that varies in relation to a longitudinal acceleration of the vehicle is within a predetermined range, to thereby switch the transmission characteristics of the road-surface input torque, to characteristics that more suppress transmission of the road-surface input torque to the steering wheel than when the brake is in an off-state.

8. The control apparatus according to claim 1, wherein the assist compensation amount calculation section is configured to calculate the assist compensation amount on the basis that a vehicle speed is within a predetermined stationary-state vehicle speed range close to 0 and within a predetermined flutter-causing vehicle speed range, to thereby switch the transmission characteristics of the road-surface input torque, to characteristics that more suppress transmission of the road-surface input torque to the steering wheel than when the vehicle speed is within neither the stationary-state vehicle speed range nor the flutter-causing vehicle speed range.

9. The control apparatus according to claim 1, wherein the assist compensation amount calculation section is configured to calculate the assist compensation amount on the basis that a predetermined impact reflected value whose value varies when a large impact is input from a road surface has exceeded a predetermined threshold, to thereby switch the transmission characteristics of the road-surface input torque for a predetermined duration of time, to characteristics that more suppress transmission of the road-surface input torque to the steering wheel than when a derivative value of the torque is smaller than the threshold.

10. The control apparatus according to claim 6, wherein:
the apparatus comprises a damping controller calculating a damping compensation amount for correcting the basic assist amount to a side on which the rotation of the motor is suppressed, as a rotational speed of the motor is higher; and
the damping controller is configured to calculate the damping compensation amount having a larger value, when the assist compensation amount calculation section has calculated the assist compensation amount that switches the transmission characteristics of the road-surface input torque, to characteristics that suppress transmission of the road-surface input torque to the steering wheel.

11. A control method provided to an electric power steering system comprising:
an input shaft connected to a steering wheel of a vehicle and rotated together with the steering wheel, being urged by a steering wheel torque that is an input caused by manipulation of the steering wheel;
a torque detector detecting torque applied to a torsion bar on the basis of a torsion angle of the torsion bar, the torsion bar being provided to a part of a torque transmission path for transmitting rotation of the input shaft to the steering wheel of the vehicle; and
a motor generating an assist steering force for assisting the manipulation of the steering wheel when the steering wheel is steered by the manipulation of the steering wheel, and
the method controlling the assist steering force by controlling rotation of the motor, wherein:
the method comprises:
a basic assist amount calculation step of calculating a basic assist amount for assisting the manipulation of the steering wheel on the basis of a torque detected by the torque detector;
a compensation amount calculation step of calculating an assist compensation amount for correcting the calculated basic assist amount;
a correction step of calculating a corrected assist amount by correcting the calculated basic assist amount on the basis of the calculated assist compensation amount; and
a motor drive step of driving the motor on the basis of the corrected assist amount, and
the assist compensation amount calculation step:
uses at least two kinds of input signals that reflect operations of the elect power steering system to calculate the assist compensation amount so as to meet the following specifications:
a forward input specification corresponding to characteristics of transmitting the steering wheel torque to a road surface in the electric power steering system, the characteristics being equal to those of the case where the motor is driven with no correction of the basic assist amount by the assist compensation amount; and
a reverse input specification corresponding to characteristics transmitting road-surface input torque that is a force received by the steering wheel from a road surface on which the vehicle runs, in the electric power steering system the characteristics exhibiting more transmission of the road-surface input torque to the steering wheel than in the case where the motor is driven with no correction of the basic assist amount by the assist compensation amount, and
calculates an assist compensation amount suitable for a vehicle-state value that influences the transmission characteristics of the road-surface input torque to suppress frequency alteration at a resonance point in the transmission characteristics, the frequency alteration being caused by variation of the vehicle-state value.

12. An electric power steering system comprising:
an input shaft connected to a steering wheel of a vehicle and rotated together with the steering wheel, being urged by a steering wheel torque that is an input caused by manipulation of the steering wheel;
a torque detector detecting torque applied to a torsion bar on the basis of a torsion angle of the torsion bar, the torsion bar being provided to a part of a torque transmission path for transmitting rotation of the input shaft to the steering wheel of the vehicle;
a motor generating an assist steering force for assisting the manipulation of the steering wheel by rotation when the steering wheel is steered by the manipulation of the steering wheel, and controlling the assist steering force through control of the rotation;
a basic assist amount calculation section calculating a basic assist amount for assisting the manipulation of the steering wheel on the basis of a torque detected by the torque detector;
an assist compensation amount calculation section calculating an assist compensation amount for correcting the basic assist amount calculated by the basic assist amount calculation section;
an assist amount correction section calculating a corrected assist amount by correcting the basic assist amount calculated by the basic assist amount calculation section on the basis of the assist compensation amount calculated by the assist compensation amount calculation section;
a motor drive section driving the motor on the basis of the corrected assist amount from the assist amount correction section, wherein,
the assist compensation amount calculation section is configured to:
use at least two kinds of input signals that reflect operations of the electric power steering system to calculate the assist compensation amount so as to meet the following specifications:
a forward input specification corresponding to characteristics of transmitting the steering wheel torque to a road surface in the electric power steering system, the characteristics being equal to those of the case where the motor is driven with no correction of the basic assist amount by the assist compensation amount; and
a reverse input specification corresponding to characteristics of transmitting road-surface input torque that is a force received by the steering wheel from a road surface on which the vehicle runs, in the electric power steering system, the characteristics exhibiting more transmission of the road-surface input torque to the steering wheel than in the case where the motor is driven with no correction of the basic assist amount by the assist compensation amount, and
calculate an assist compensation amount suitable for a vehicle-state value that influences the transmission characteristics of the road-surface input torque to suppress frequency alteration at a resonance point in the transmission characteristics, the frequency alteration being attributed to variation of the vehicle-state value.

13. The control apparatus according to claim 2, wherein the assist compensation amount calculation section is configured to calculate a different assist compensation amount depending on whether the steering wheel is being turned or being returned to suppress frequency alteration at a resonance point in the transmission characteristics of the road-surface input torque.

14. The control apparatus according to claim 2, wherein: the assist compensation amount calculation section comprises:
a first compensation amount calculator designed to calculate an assist compensation amount that meets the forward input specification and the reverse input specification, with a minimum value of the vehicle-state value; and
a second compensation amount calculator designed to calculate an assist compensation amount that meets the forward input specification and the reverse input specification, with a maximum value of the vehicle-state value, and
the control apparatus comprises:
a means calculating a first assist compensation amount using an actual vehicle-state value and the first compensation amount calculator;
a means calculating a second assist compensation amount using an actual vehicle-state value and the second compensation amount calculator; and
a means determining an assist compensation amount with the actual vehicle-state value, by linearly interpolating the first and second compensation amounts using the maximum value, the minimum value and the actual value of the vehicle-state value.

15. The control apparatus according to claim 14, wherein: the assist compensation amount calculation section comprises:
a means comprising:
a plurality of the first compensation amount calculators that are designed for minimum values of the plurality of the vehicle-state values; and
a plurality of the second compensation amount calculators that are designed for maximum values of the plurality of the vehicle-state values,
the first and second compensation amount calculators being designed using the plurality of vehicle-state values,
the apparatus comprises:
a means calculating a first assist compensation amount for each of the plurality of vehicle-state values, using the actual vehicle-state value and the first compensation amount calculator corresponding to the vehicle-state value;
a means calculating a second assist compensation amount for each of the plurality of vehicle-state values, using the actual vehicle-state value and the second compensation amount calculator corresponding to the vehicle-state value; and
a means determining an assist compensation amount for the actual vehicle-state value, by linearly interpolating the first and second assist compensation amounts corresponding to each of the plurality of vehicle-state values by using the maximum value and the minimum values of the vehicle-state value, and the actual vehicle-state value.

16. The control apparatus according to claim 2, wherein the assist compensation amount calculation section is configured to calculate the assist compensation amount on the basis that a brake of the vehicle is in an on-state, to thereby switch the transmission characteristics of the road-surface input torque, to characteristics that more suppress transmission of the road-surface input torque to the steering wheel than when the brake is in an off-state.

17. The control apparatus according to claim 16, wherein the assist compensation amount is configured to calculate the assist compensation amount on the basis that the brake is in an on-state, a vehicle speed is within a predetermined middle- to high-speed range, and an acceleration correlation value that varies in relation to a longitudinal acceleration of the vehicle is within a predetermined range, to thereby switch the transmission characteristics of the road-surface input torque, to characteristics that more suppress transmission of the road-surface input torque to the steering wheel than when the brake is in an off-state.

18. The control apparatus according to claim 2, wherein the assist compensation amount calculation section is configured to calculate the assist compensation amount on the basis that a vehicle speed is within a predetermined stationary-state vehicle speed range close to 0 and within a predetermined flutter-causing vehicle speed range, to thereby switch the transmission characteristics of the road-surface input torque, to characteristics that more suppress transmission of the road-surface input torque to the steering wheel than when the vehicle speed is within neither the stationary-state vehicle speed range nor the flutter-causing vehicle speed range.

19. The control apparatus according to claim 2, wherein the assist compensation amount calculation section is configured to calculate the assist compensation amount on the basis that a predetermined impact reflected value whose value varies when a large impact is input from a road surface has exceeded a predetermined threshold, to thereby switch the transmission characteristics of the road-surface input torque for a predetermined duration of time, to characteristics that more suppress transmission of the road-surface input torque to the steering wheel than when a derivative value of the torque is smaller than the threshold.

20. The control apparatus according to claim 16, wherein:
the apparatus comprises a damping controller calculating a damping compensation amount for correcting the basic assist amount to a side on which the rotation of the motor is suppressed, as a rotational speed of the motor is higher; and
the damping controller is configured to calculate the damping compensation amount having a larger value, when the assist compensation amount calculation section has calculated the assist compensation amount that switches the transmission characteristics of the road-surface input torque, to characteristics that suppress transmission of the road-surface input torque to the steering wheel.

* * * * *